United States Patent [19]

Blankemeyer et al.

[11] Patent Number: 4,688,549
[45] Date of Patent: Aug. 25, 1987

[54] GAS-FIRED PORTABLE COOKING APPARATUS

[75] Inventors: William J. Blankemeyer, Box 84, Ottawa, Ohio 45875; James L. Hetherwick, Sylvania, Ohio

[73] Assignee: William J. Blankemeyer, Ottawa, Ohio

[21] Appl. No.: 903,685

[22] Filed: Sep. 4, 1986

[51] Int. Cl.⁴ .................. A47J 27/00; F24H 1/00
[52] U.S. Cl. ..................... 126/373; 126/376; 99/413
[58] Field of Search .............. 126/25 R, 9 R, 376, 126/25 A, 38, 387, 40 R, 43, 373, 363, 377, 215; 99/410–415; 220/428, 8

[56] References Cited

U.S. PATENT DOCUMENTS

| | | | |
|---|---|---|---|
| 118,095 | 8/1871 | Beatty | 126/38 |
| 299,713 | 6/1884 | Babbit et al. | 126/38 |
| 1,133,430 | 3/1915 | Cochran | 99/413 |
| 1,241,002 | 9/1917 | Nevens | 99/413 |
| 2,021,465 | 11/1935 | Ritscher | 99/414 |
| 2,531,684 | 11/1950 | Jackson | 126/25 A |
| 2,814,286 | 4/1955 | Arnold | 126/43 |
| 3,722,498 | 3/1973 | Kimbrough | 126/9 R |
| 3,794,013 | 2/1974 | Upton | 126/40 |
| 4,062,341 | 12/1977 | Panzarella | 126/25 R |
| 4,105,013 | 8/1978 | Vache | 126/38 |
| 4,164,930 | 8/1979 | Johnston | 126/38 |
| 4,334,462 | 6/1982 | Hefling | 126/9 R |
| 4,452,224 | 6/1984 | Misumida | 126/30 |
| 4,553,524 | 11/1985 | Wheat et al. | 126/25 R |

FOREIGN PATENT DOCUMENTS 821192 11/1937 France .................. 99/417

Primary Examiner—J. C. Yeung
Attorney, Agent, or Firm—MacMillan & Sobanski

[57] ABSTRACT

An improved gas-fired cooking device and associated cooking utensils is disclosed. The cooking device includes a hollow cylindrical base member having a closed bottom end. A plurality of legs are secured to the base member, each leg having a lower end adapted to engage a horizontal surface and an upper end extending vertically upwardly above the base member. An annular support ring is secured to each of the legs at the upper end thereof. A cooking vessel is provided having support means attached to the exterior surface thereof for engaging the support rings so as to be supported above the base member. A gas burner assembly is adjustably supported on the bottom end of the base member. The gas burner assembly may be adjusted upwardly or downwardly so as to move it toward or away from the supported cooking vessel. Cooking baskets are also provided for use within the cooking vessel. In a first alternate embodiment of the invention, an annular support ring may be provided within the cooking vessel which permits the cooking baskets to rest thereon during use. In a second alternate embodiment of the invention, the cooking baskets are provided with first and second apertures formed in handles attached to the cooking baskets by means of hinges. The handle apertures cooperate with upstanding posts formed on the upper rim of the cooking vessel so as to support the baskets in different positions relative thereto.

3 Claims, 7 Drawing Figures

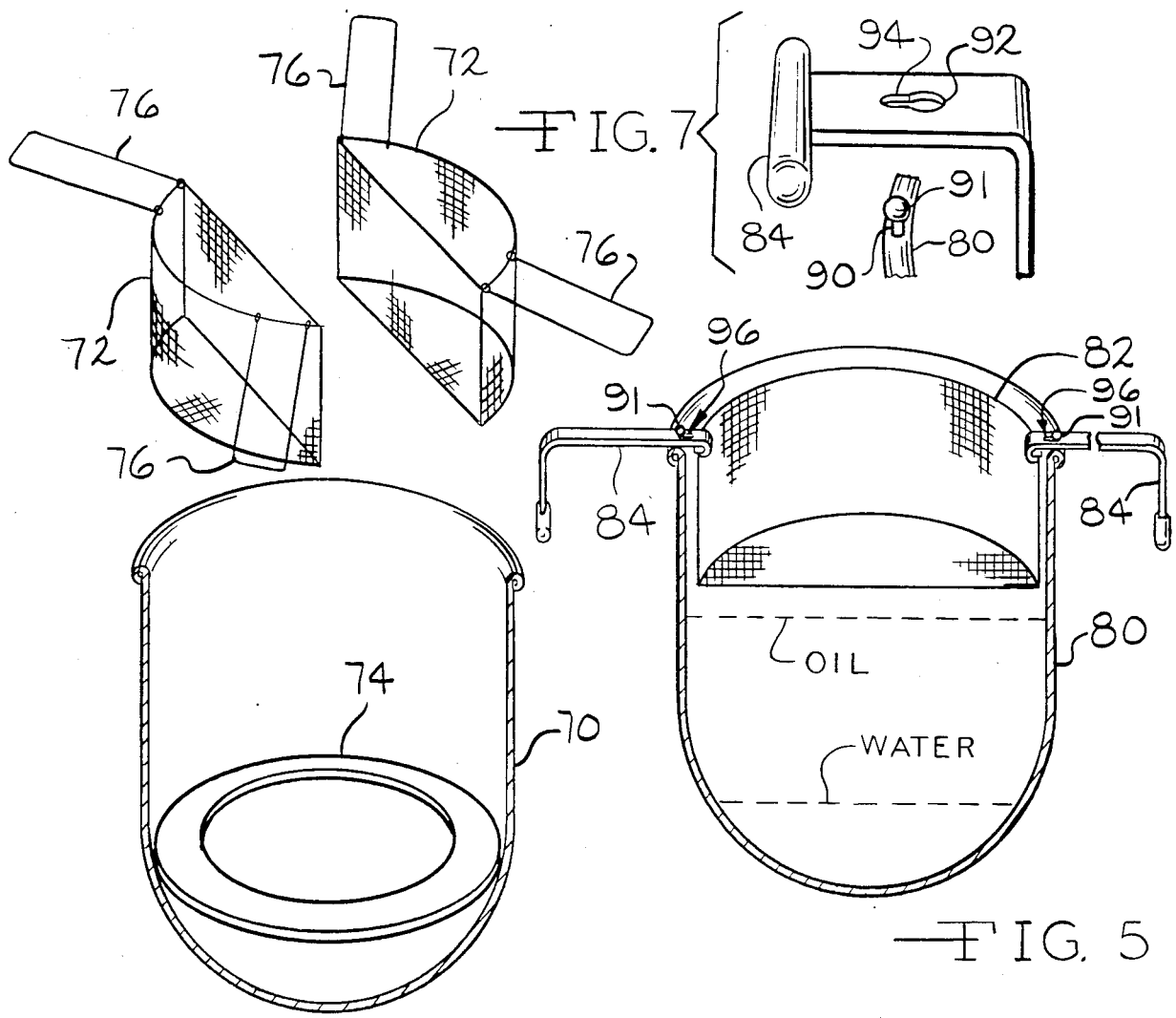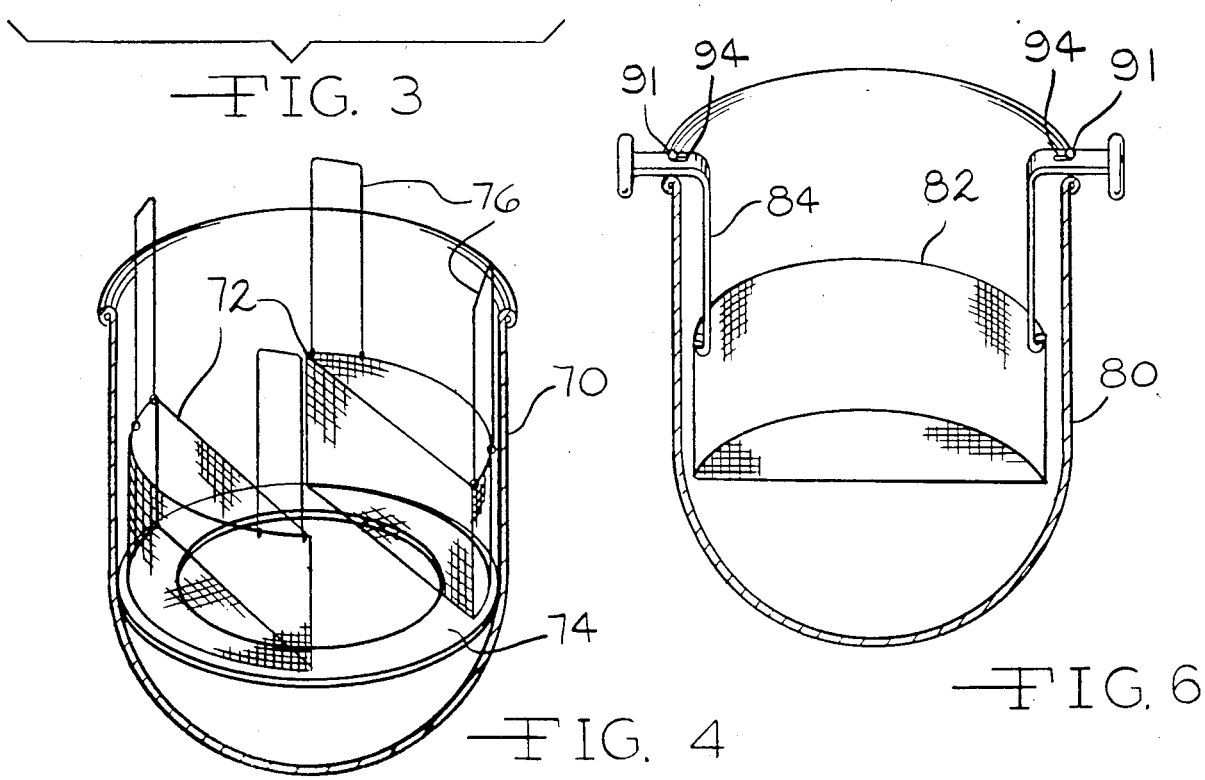

GAS-FIRED PORTABLE COOKING APPARATUS

BACKGROUND OF THE INVENTION

1. Field of the Invention

The present invention relates in general to a gas-fired cooking apparatus and in particular to such a cooking apparatus which is easily portable and very versatile.

2. Description of the Prior Art

Numerous portable cook stoves are disclosed in the prior art. U.S. Pat. No. 3,794,013 to Upton discloses a portable gas grill provided with a grill plate supported on removable legs. The grill plate is provided with a drain to drain collected grease. U.S. Pat. No. 4,105,013 to Vache discloses a portable stove provided with cooking vessel support means. U.S. Pat. No. 4,164,930 to Johnston discloses a compact portable cooking stove, the components of which compactly nest together. This portable cook stove is adapted to burn liquid fuel without the need for complicated priming procedures.

U.S. Pat. No. 4,334,462 to Hefling discloses a gas-fired cooking apparatus including a cooking container, a support collar, and a support base which are removably secured together by a stud and a pair of resilient spring plates. U.S. Pat. No. 4,553,524 to Wheat et al. discloses a portable gas-fired cooking device adapted for use as a grill on which to broil or barbecue food, as well as for use in cooking food in conventional cooking utensils such as pots and frying pans.

U.S. Pat. No. 3,722,498 to Kimbrough discloses a portable deep fryer assembly which is gas-fired. A thick heat plate is disposed intermediate the ends of a vertically extending tube. The heat plate and the portion of the vertically extending tube which is disposed thereabove constitute a container for cooking oil. The portion of the vertically extending tube which is disposed beneath the heat plate is adapted for attachment of legs and a gas burner. A chimney is detachably connected to the vertically extending tube. U.S. Pat. No. 4,062,341 to Panzarella discloses a portable wok stove fired by an adjustable gas flame. The stove is configured to evenly heat the bottom of a wok and provide adequate shielding from wind to make the flame relatively insensitive thereto. U.S. Pat. No. 4,452,224 to Misumida discloses a casserole set including a gas burner within a portable cooking stove and a transparent or semi-transparent pan. U.S. Pat. Nos. 118,095 to Beatty, 299,713 to Babbit et al., and 2,814,286 to Arnold disclose various devices for supporting a vessel above a heating element.

SUMMARY OF THE INVENTION

The present invention relates to an improved gas-fired cooking device and associated cooking utensils. The cooking device includes a hollow cylindrical base member having a closed bottom end. A plurality of legs are secured to the base member, each leg having a lower end adapted to engage a horizontal surface and an upper end extending vertically upwardly above the base member. An annular support ring is secured to each of the legs at the upper end thereof. A cooking vessel is provided having support means attached to the exterior surface thereof for engaging the support rings so as to be supported above the base member. A gas burner assembly is adjustably supported on the bottom end of the base member. The gas burner assembly may be adjusted upwardly or downwardly so as to move it toward or away from the supported cooking vessel. Cooking baskets are also provided for use within the cooking vessel. In a first alternate embodiment of the invention, an annular support ring may be provided within the cooking vessel which permits the cooking baskets to rest thereon during use. In a second alternate embodiment of the invention, the cooking baskets are provided with first and second apertures formed in handles attached to the cooking baskets by means of hinges. The handle apertures cooperate with upstanding posts formed on the upper rim of the cooking vessel so as to support the baskets in different positions relative thereto.

It is an object of the present invention to provide a portable gas-fired cooking device which will securely support a cooking vessel.

It is another object of the present invention to provide a cooking device which includes a burner assembly which is adjustably supported therein.

It is a further object of the present invention to provide a cooking device and associated utensils which can be readily used as a conventional pot, a deep fryer, and a steamer.

Other objects and advantages of the present invention will become apparent to those skilled in the art from the following description of the preferred embodiments, when read in light of the accompanying drawings.

BRIEF DESCRIPTION OF THE DRAWINGS

FIG. 3 is a sectional perspective view of a first alternate embodiment of the cooking vessel and associated cooking baskets in accordance with the present invention, wherein the cooking baskets are shown in a raised position.

FIG. 4 is a sectional perspective view of the cooking vessel and associated cooking baskets illustrated in FIG. 3, wherein the cooking baskets are shown in a cooking position within the cooking device.

FIG. 5 is a sectional perspective view of a second alternate embodiment of the cooking vessel and associated cooking basket in accordance with the present invention, wherein the cooking basket is shown in a raised position.

FIG. 6 is a sectional perspective view of the cooking vessel and associated cooking basket illustrated in FIG. 5, wherein the cooking basket is shown in a cooking position.

FIG. 7 is an enlarged fragmentary perspective view of the cooking basket handle retention means shown in FIGS. 5 and 6.

DETAILED DESCRIPTION OF THE PREFERRED EMBODIMENTS

Figure 2:
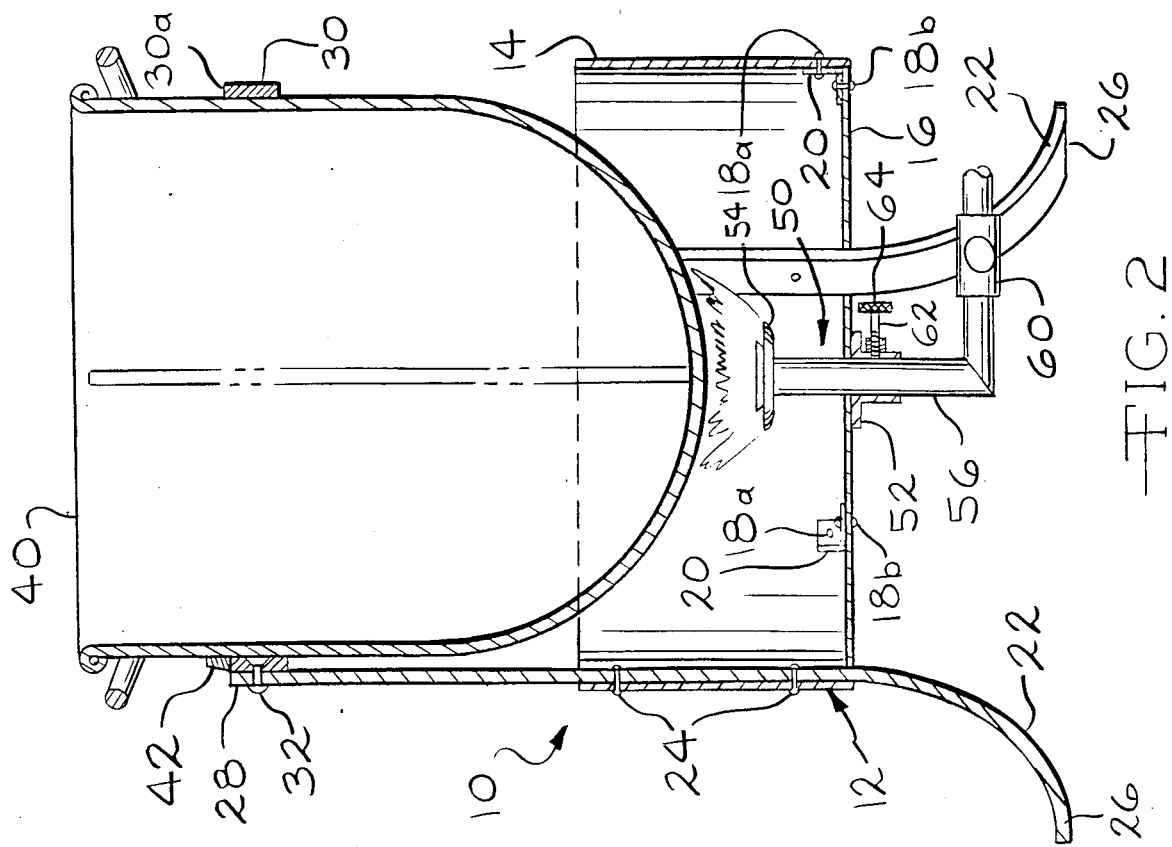
FIG. 2 is a sectional elevational view of the cooking device and cooking vessel illustrated in FIG. 1.
Figure 1:
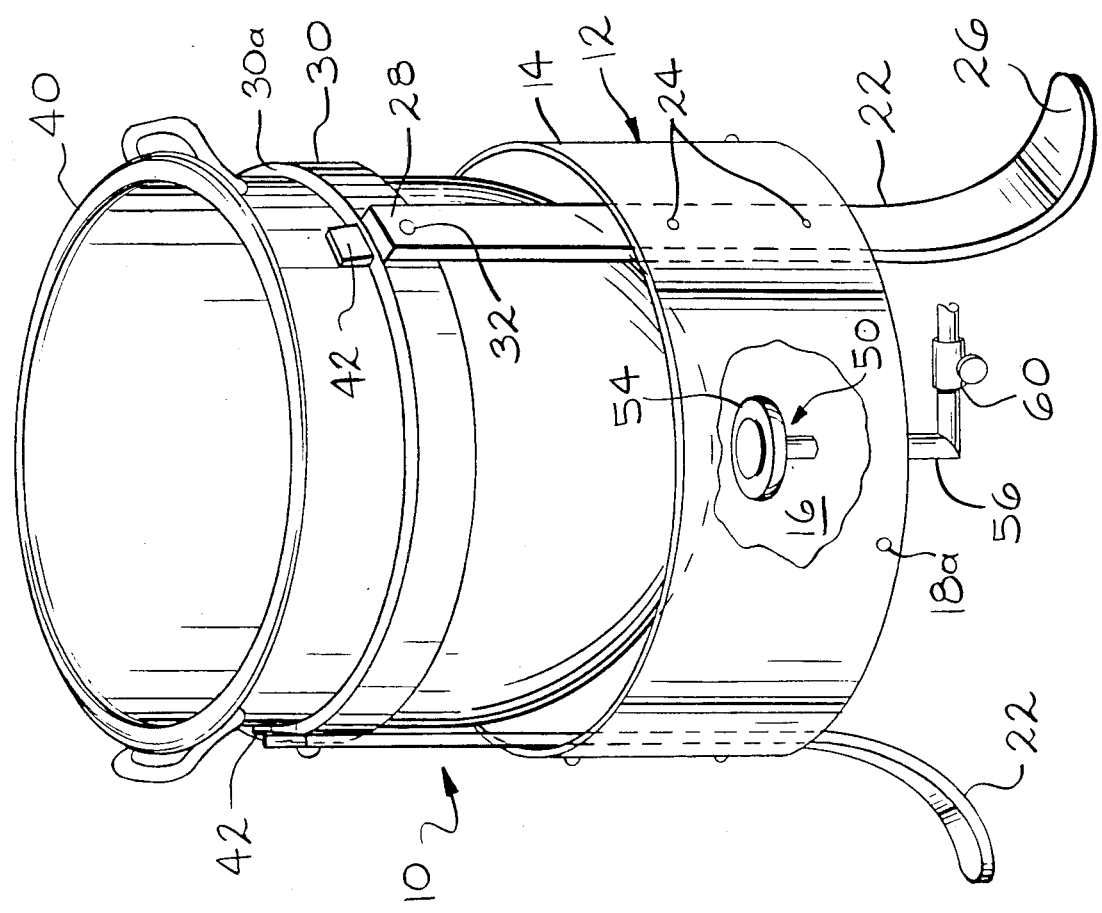
FIG. 1 is a perspective view of a cooking device and cooking vessel in accordance with the present invention.

Referring now to FIGS. 1 and 2, the reference numeral 10 indicates generally a portable gas-fired cooking device in accordance with the present invention. The cooking device 10 includes a base member, indicated generally at 12, formed from a hollow cylindrical side wall 14 and a circular bottom plate 16. As best shown in FIG. 2, the bottom plate 16 is secured to the lower end of the cylindrical side wall 14 by upper and lower pluralities of fasteners 18a and 18b, respectively. Each of the upper plurality of fasteners 18a extends through an aperture formed in the side wall 14 and through a corresponding aperture formed in the upper portion of one of a plurality of L-shaped brackets 20. Similarly, each of the lower plurality of fasteners 18b extends through an aperture formed in the lower portion of the bottom plate 16 and through a corresponding aperture formed in one of the plurality of L-shaped brackets 20. Thus, the bottom plate 16 closes the lower end of the hollow cylindrical side wall 14. However, a gap may be provided between the bottom plate 16 and the lower end of the side wall 14 to permit the passage of air therethrough for combustion, as will become apparent below.

The base member 12 is supported by three legs 22 which are secured to the cylindrical side wall 14 by a plurality of fasteners 24. Each leg 22 has a lower end 26 which is adapted to engage a horizontal surface upon which the cooking device 10 is to be utilized. The upper end 28 of each leg extends vertically upwardly, terminating adjacent to an annular cooking vessel support band 30 disposed above the base member 12. The upper ends 28 of each of the legs 22 are secured to the cooking vessel support band 30 by respective fasteners 32. The fasteners 18, 24, and 32 can be removed and the cooking device 10 can be disassembled for convenient storage or transportation in a smaller space than occupied by the assembled cooking device 10.

The cooking device 10 thus far described constitutes a free standing, self-supporting structure which is adapted to support a cooking vessel 40. The cooking vessel 40 has an upper portion which is generally shaped in the form of a hollow cylinder having an outer diameter which is slightly less than the inner diameter of the support band 30. The lower portion of the cooking vessel 40 is generally shaped in the form of a hollow semi-sphere. A plurality of flanges 42 are secured to the outer surface of the cooking vessel 40. The flanges 42 are spaced about the outer surface of the cooking vessel 40 so as to engage an upwardly facing surface 30a of the support band 30. Thus, it can be seen that the cooking vessel 40 can be lowered into the cooking device 10 so as to be supported upon the support band 30 by the flanges 42. Alternatively, the flanges 42 can be replaced by an annular band (not shown) secured about the outer surface of the cooking vessel 40 for the same purpose.

A burner assembly, indicated generally at 50, is secured to and supported by the base member 12 of the cooking device 10. As shown in FIG. 2, the burner assembly bracket 52 is secured to the lower side of the bottom plate 16. A lower hollow cylindrical portion of the burner assembly bracket 52 extends downwardly from the bottom plate 16. An aperture is formed through the bottom plate 16, and the lower hollow cylindrical portion of the burner assembly bracket 52 is aligned therewith. The burner assembly 50 includes a burner cup 54 secured to a conduit 56. The conduit 56 extends through the burner assembly bracket 52 and through the aperture formed through the bottom plate 16, connecting the burner cup 54 with a source of propane gas (not shown) or other fuel source. The flow of gas through the conduit 56 is controlled by a gas flow regulator 60. A pressure reducing valve (not shown) can also be provided in the conduit 56 between the source of gas and the gas flow regulator 60.

The burner assembly bracket 52 includes means for effecting a vertical adjustment of the burner cup 54 relative to the bottom plate 16. The adjustment means includes a threaded fastener 62 provided with a head portion 64. The threaded fastener 62 is adapted to engage a correspondingly threaded aperture formed through lower portion of the burner assembly bracket 52. The threaded fastener 62 can be rotated in one direction to frictionally engage the exterior surface of the conduit 56 within the lower portion of the burner assembly support bracket 52. The threaded fastener 62 can be rotated in the opposite direction to release the frictional engagement of the conduit 56. When the conduit 56 is not frictionally engaged within the bracket 52, the entire burner assembly 50 can be moved upwardly or downwardly. When the burner assembly 50 is disposed in a desired position relative to the cooking vessel 40, the threaded fastener 62 is rotated to frictionally engage the conduit 56 within the bracket 52, thereby securing the burner assembly 50 in the desired position. Thus, the cooking device 10 of the present invention supports the cooking vessel 40 at a predetermined height relative thereto, but also supports the burner assembly 50 at a height which is adjustable relative to the cooking vessel 40.

The cooking vessel 40 can be utilized in conjunction with the cooking device 10 as a pot to heat various foods. For example, soups, stews, and other foods can be placed directly in the cooking vessel 40 for heating. By adjusting the relative height of the burner assembly 50, the temperature of the heat applied to the cooking vessel 40 can be adjusted. Also, by manipulating the regulator 60, the size of the flame generated by the burner assembly 50 can be adjusted, also affecting the temperature applied to the cooking vessel 40.

Referring now to FIGS. 3 and 4, a first alternate embodiment of a cooking vessel 70 and its associated pair of cooking baskets 72 are shown. The cooking vessel 70 is similar to the cooking vessel 40 shown in FIGS. 1 and 2, but is further provided with a support ring 74. The support ring 74 is shaped in the form of a thin flat annulus which is disposed within the cooking vessel 70. For example, the support ring 74 may simply be placed within the cooking vessel 70 so as to rest against the smaller diameter lower semi-spherical portion thereof. When supported in this manner, the support ring 74 is easily removable from the cooking vessel so that it can be utilized as described above in connection with FIGS. 1 and 2. Alternatively, the support ring 74 may rest on a plurality of inwardly-extending flanges (not shown) secured to the inner surface of the cooking vessel 70, or may be secured directly thereto.

As shown in FIG. 4, the support ring 74 permits the cooking vessel 70 to support the cooking baskets 72 in a cooking position within the cooking vessel 70, as shown in FIG. 4. Each of the cooking baskets 72 is semi-cylindrical in shape. Thus, the two cooking baskets 72 may be simultaneously disposed within the upper cylindrical portion of the cooking vessel 70. By forming the cooking baskets 72 in this shape, different foods can be cooked simultaneously in the cooking vessel 70. The cooking baskets 72 are each provided with hinged handles 76 which permit the cooking baskets 72 to be raised and lowered within the cooking vessel 70. The handles 76 are sufficiently long to permit them to extend out of the the top of the cooking vessel 70 when the cooking baskets 72 are in the cooking position. As will be explained in greater detail below with reference to FIGS. 5 and 6, the cooking baskets 72 may be utilized to deep fry or steam different foods within the cooking vessel 70.

Referring now to FIGS. 5 and 6, a second alternate embodiment of a cooking vessel 80 and its associated cooking basket 82 are shown. The cooking basket 82 is provided with a pair of handles 84 which are each connected by means of a hinge to the cooking basket 82. When the cooking basket 82 is in the lower, cooking position illustrated in FIG. 6, food in the basket can be cooked as desired. For example, the food in the cooking basket 82 can be deep fried if the cooking vessel 80 is filled with cooking oil up to the level of the dotted line designated "Oil" in FIG. 5. Alternatively, the food in the cooking basket 82 can be steamed if the cooking vessel 80 is filled with water up to the level of the dotted line designated "Water" in FIG. 5. When the cooking basket 82 is in an upper, draining position illustrated in FIG. 5, the food in the cooking basket 82 can be drained of oil or water, or may simply be kept warm above the oil or water.

The cooking vessel 80 and the cooking basket 82 are provided with means for supporting the cooking basket 82 in the upper, draining position (FIG. 5) and the lower, cooking position (FIG. 6). As shown in FIG. 7, the supporting means can include a pair of upwardly-extending posts 90 secured to the opposite sides of the upper rim of the cooking vessel 80. An enlarged head 91 may be provided at the upper end of each post 90. A first aperture 92 is provided in each of the basket handles 84 near the end thereof which is spaced apart from the cooking basket 82. The first apertures 92 are sized to receive the enlarged heads 91 of the posts 90 therethrough. Each of the first apertures 92 includes a slot portion 94. The slot portions 94 are sized to receive the posts 90 therethrough, but not the enlarged heads 91. The first apertures 92 are provided to retain the cooking basket 82 in the lower, cooking position illustrated in FIG. 6. To do this, the cooking basket 82 is lowered within the cooking vessel 80 such that the first apertures 92 are lowered about the heads 91 and the posts 90. In this position, the cooking basket 82 is retained within the cooking vessel 80. However, to insure that the cooking basket 82 is not moved, the handles 84 may be moved inwardly such that the posts 90 are received in the slot portions 94. In order to retain the cooking basket 82 in the upper, draining position illustrated in FIG. 5, a second aperture, indicated generally at 96, is provided in each of the basket handles 84 near the end adjacent to the cooking basket 82. The second apertures 96 are similar in structure and operation to the first apertures 92 described above.

The foregoing detailed description of the invention is intended only to enable one skilled in the art to which it pertains to practice the present invention and not to limit the scope of the invention, which is limited only by the spirit of the appended claims.

What is claimed is:

1. A cooking vessel comprising:
   a major vessel;
   at least one cooking basket sized to fit into said major vessel;
   at least one handle hingedly connected to said basket, said handle being generally L-shaped and having a first aperture formed on one leg thereof and a second aperture formed on a second leg thereof; and
   at least one post attached to said major vessel, said post being operable to releasably engage said handle through either of said apertures provided therein to support said cooking basket in either of two positions relative to said major vessel.

2. The invention defined in claim 1 wherein said cooking basket is provided with two of said handles and said major vessel is provided with two upstanding posts for selectively supporting said cooking basket in either a cooking position or a draining position relative to said major vessel.

3. The invention defined in claim 1 wherein said post includes a head portion having a larger outer diameter than said post, and said aperture includes a slot portion having a smaller diameter than said aperture, said aperture being sized to receive said head portion therethrough, said slot portion being sized to receive said post therethrough but not said head portion.

* * * * *